United States Patent
Kraus

(10) Patent No.: US 7,390,043 B2
(45) Date of Patent: Jun. 24, 2008

(54) CLOSURE COVER

(75) Inventor: Willibald Kraus, Grünstadt (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 368 days.

(21) Appl. No.: 10/519,205

(22) PCT Filed: Jun. 5, 2003

(86) PCT No.: PCT/DE03/01860

§ 371 (c)(1),
(2), (4) Date: Sep. 12, 2005

(87) PCT Pub. No.: WO04/000677

PCT Pub. Date: Dec. 31, 2003

(65) Prior Publication Data

US 2006/0102631 A1    May 18, 2006

(30) Foreign Application Priority Data

Jun. 19, 2002   (DE) ............................... 202 09 514

(51) Int. Cl.
*B62D 39/00* (2006.01)
(52) U.S. Cl. ................. 296/1.06; 215/355; 220/DIG. 19
(58) Field of Classification Search ............... 296/208, 296/1.06; 220/DIG. 19; 215/355
See application file for complete search history.

(56) References Cited

U.S. PATENT DOCUMENTS

| 3,430,777 | A |   | 3/1969 | Esposito, Jr. |
| 3,606,446 | A | * | 9/1971 | Leslie ........................ 296/208 |
| 4,176,755 | A |   | 12/1979 | Winchell |
| 4,682,707 | A | * | 7/1987 | Wiles ......................... 220/789 |
| 4,784,285 | A | * | 11/1988 | Patel ........................... 220/782 |
| 4,801,040 | A |   | 1/1989 | Kraus |
| 4,995,521 | A | * | 2/1991 | von Schuckmann ......... 215/249 |
| 5,868,273 | A | * | 2/1999 | Daenen et al. .............. 220/795 |
| 5,882,273 | A |   | 3/1999 | Jang |
| 6,786,521 | B1 | * | 9/2004 | Jaffke et al. ................. 296/1.06 |
| 2002/0008405 | A1 | * | 1/2002 | Yee ............................. 296/154 |
| 2004/0139660 | A1 | * | 7/2004 | Helferty ....................... 49/465 |
| 2004/0164498 | A1 | * | 8/2004 | Stratman et al. ............ 277/628 |
| 2006/0186130 | A1 | * | 8/2006 | Jatzke et al. ................ 220/789 |

OTHER PUBLICATIONS

International Search Report, date mailed Jul. 19, 2004.

* cited by examiner

*Primary Examiner*—Jason S Morrow
(74) *Attorney, Agent, or Firm*—Fay Sharpe LLP

(57) ABSTRACT

The invention relates to a closure cover or closing lid. It is characterized in that the sealing element 15, consisting of an elastic material, is connected via engaging elements 20 with counter-engaging elements 25 of a covering element 10 consisting of a hard component. The sealing element 15 includes a contact flange 30 and, opposite to same, at a distance, at least one elastic sealing lip 35.

13 Claims, 1 Drawing Sheet

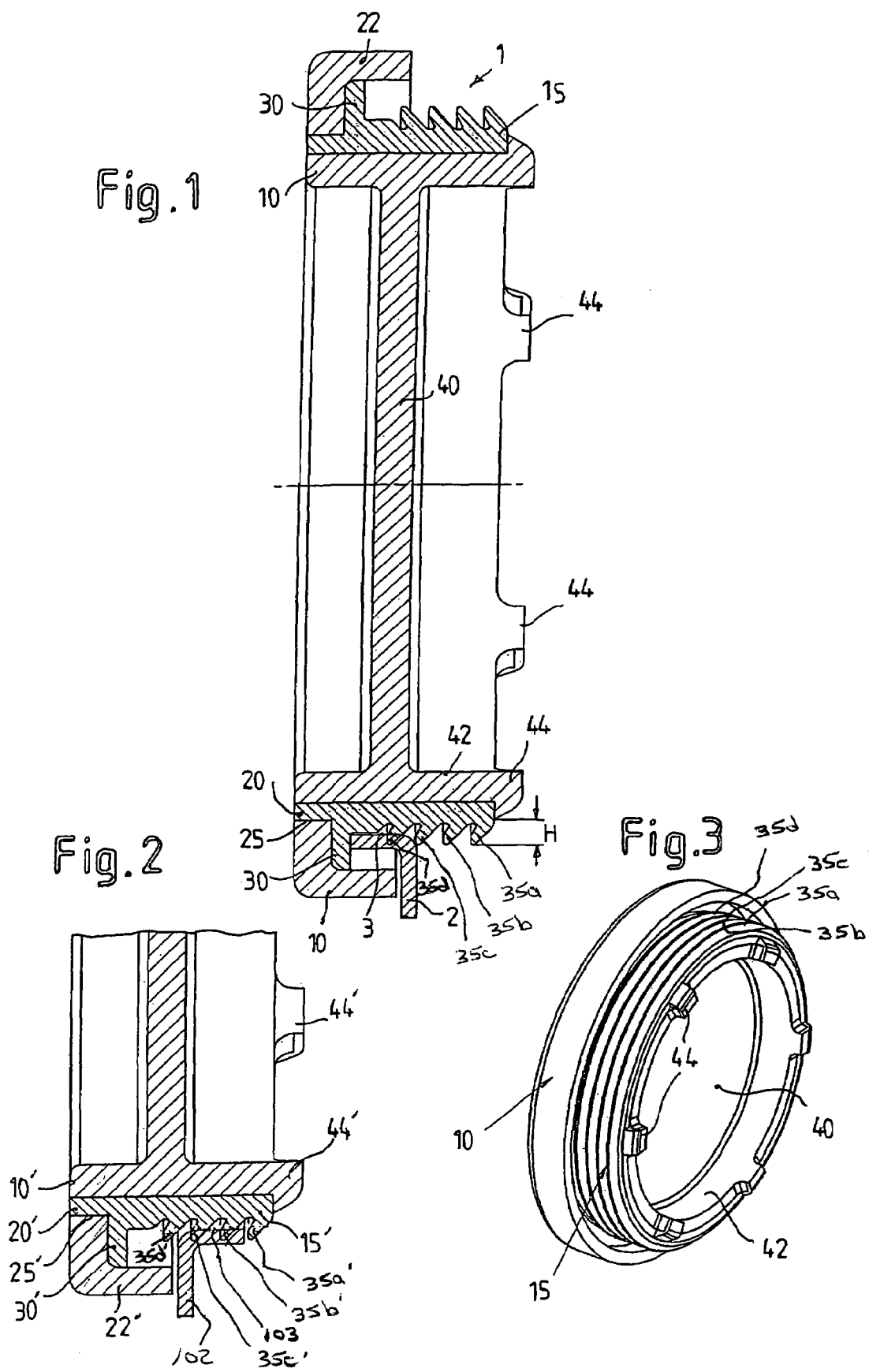

CLOSURE COVER

This application claims the benefit of PCT Application No. PCT/DE2003/01860 which was filed on Jun. 5, 2003 (published as WO2004/000677), which in turn claims priority of German Application No. GE 202 09 514.2 which was filed on Jun. 19, 2002.

BACKGROUND

This application claims the benefit of PCT Application No. PCT/DE2003/01860 which was filed on Jun. 5, 2003 (published as WO2004/000677), which in turn claims priority of German Application No. GE 202 09 514.2 which was filed on Jun. 19, 2002.

The invention relates to a closure cover or closing lid made of plastic material adapted for tight sealing of an opening in a support plate (i.e. a motor vehicle body panel). The closure cover can include a covering element and a sealing element.

A closure cover for tight sealing of an opening in a support plate is already known in the art (DE 43 27 945 A1). The aforementioned closure cover consists of a plastic covering element along with a connected sealing element. The two elements comprise a core component of hard material and a shell component of a softer material. The shell component encloses the core component and can be cemented together with the support plate, at its outer edges. Such cementation may be cumbersome to perform in certain application fields.

It is desirable to develop a closure cover of the initially named kind in such a manner to simplify installation without outside force, and to ensure a tight seal of the to be sealed opening in a support plate.

BRIEF DESCRIPTION

In one aspect of the exemplary embodiments, to be described in more detail hereinafter, the sealing element, comprising an elastic material, can be joined via engaging elements with counter-engaging elements of the covering element. The covering element can include a hard component. The sealing element can present a contact flange and, opposite same, at a distance, at least one elastic sealing lip. The elastic sealing element can thus be installed, in simple fashion, in the covering element, whereupon the entire unit can be immediately employed for installation in an opening of, for example, a support plate, without the need of cementation. The elastic sealing lip, in cooperation with the contact flange, ensures sealing of the support opening.

In accordance with yet another aspect of the exemplary embodiments, it is to be appreciated that the engaging elements of the sealing element can be designed as cross pieces, which are distributed over the circumference of the closure cover and are embeddable in openings of the covering element. Alternatively, another arrangement can be provided in which the engaging elements of the sealing element constitute recesses. The references can be locked with projections of the covering element.

Particularly good sealing results with the inclusion of several sealing lips successively arranged at the circumference of the sealing element. In one such arrangement, the sealing lips can be of equal height and directed toward the contact flange. Alternatively, in another embodiment the sealing lips can be of different heights and directed (facing) away from the contact flange.

In accordance with yet still another aspect of the exemplary embodiments, the covering element can be a hollow cylinder equipped with a partitioning wall. The hollow cylinder can include in a frontal region equipped with a counter-engaging element, a flange in which can be embedded the contact flange of the sealing element. In this arrangement, the covering element can be positioned opposite the frontal region, and enclose, at least partially, the sealing element by way of a limitation shoulder. The limitation shoulder can be lower than the height of the elastic sealing lip. Also, the limitation shoulder can include several projections distributed over the circumference of the covering element.

DESCRIPTION OF THE DRAWINGS

The invention will be described in more detail from exemplary embodiments represented in the drawings wherein:

FIG. 1 depicts a center section through a closure cover according to a first embodiment of the invention, with the lower region schematically installed in an opening of a support plate;

FIG. 2 depicts a second embodiment of the closure cover following installation in a support plate; and, FIG. 3 depicts a perspective view of the closure cover according to FIG. 1.

DETAILED DESCRIPTION

The closure cover 1 represented in FIG. 1 consists of a covering element 10 and a sealing element 15. The covering element 10 can be made of a hard component, whereas the sealing element 15 can be an elastic plastic material. The sealing element 15 presents engaging elements 20 which are embedded in counter-engaging elements 25 of the covering element 10. In accordance with the exemplary embodiments, the engaging elements 20 of the sealing element 15 are designed as cross-pieces distributed over the circumference of the closure cover. The engaging elements 20 are embeddable in corresponding counter-openings 25 of the covering element 10.

The covering element 10 can be designed as a hollow cylinder equipped with a partitioning wall 40. The hollow cylinder can have, on one side, a flange 22 in the frontal region which is fitted with openings distributed over the circumference. On the other side, the hollow cylinder is equipped with at least one limitation shoulder 44. The limitation shoulder 44 can include several projections distributed over the circumference of the covering element 1, as shown in FIGS. 1 and 3.

The sealing element 15 has a contact flange 30 and, opposite same, at a distance, several elastic sealing lips 35a, 35b, 35c, 35d. The elastic sealing lips 35a-35d can have the same height H and be directed towards the contact flange 30. Although not shown, it is to be appreciated that the sealing lips can have different heights and be facing away from the contact flange.

The flange 22 of the covering element 10 embeds the contact flange 30 of the sealing element 15. The limitation shoulder 44 of the covering element 10 limits the other region of the sealing element 15 and encloses same at least in part. In this arrangement, the height of the limitation shoulder 44 or of the projections is lower than the height H of the elastic sealing lips 35a-35d.

The lower region of FIG. 1 represents the installation of the closure cover in an opening 3 of the support plate 2. The support plate 2 presents a circumferential collar, which is directed towards the contact flange 30. Thus, the contact flange 30 of the elastic sealing element 15 limits the support plate 2 or the opening 3, while one sealing lip 35d places itself on the outer circumference of the opening 3 of the support plate 2 and another sealing lip 35c is positioned on the upper surface of the support plate 2. Thus, there is assurance of closure of an opening 3 of support plate 2.

With reference now to FIG. 2, a second embodiment of a closure cover is there illustrated. Like components are identified by like numerals with a single primed suffix (') and new components are identified by new numerals. In this embodiment, the support plate 102 presents a circumferential collar, which is facing away from the contact flange 30' of the sealing element 15'. Here, the four successively positioned sealing lips 35a', 35b', 35c', 35d' of the sealing element 15' come into play with the center lips 35b', 35c' sealing opening 103 of the support plate 102 and the outer sealing lips 35a', 35d' serving as limitation elements.

The exemplary embodiments provide by way of a simple closure cover, without any gluing procedure, effective and secure closing of an opening 3, 103 in a support plate 2, 102 with the support plate having highly different configurations.

The invention has been described above with reference to the preferred embodiments. Obviously, modifications and alterations will occur to others upon a reading and understanding of the specification.

The invention claimed is:

1. A closure cover (1) made of plastic for tight sealing of an opening (3) in a support plate (2) comprising:
a closure cover (1) having a covering element (10) and a sealing element (15), said sealing element (5) including an elastic material is connected by means of engaging elements (20) with counter-engaging elements (25) of said covering element (10) including a hard component, and said sealing element (15) presents a contact flange (30) and, opposite same, at a distance, at least one elastic sealing lip (35);
said closure cover (1) includes a hollow cylinder (42) equipped with a partitioning wall (40), said hollow cylinder (42) presents in a frontal region equipped with engaging elements (25), a flange (22) in which is embedded the contact flange (30) of the sealing element (15); and,
said covering element (10)—positioned opposite the frontal region—encloses, at least in part, via a limitation shoulder (44) said sealing element (15), wherein the limitation shoulder (44) is of lesser height than a height (H) of said at least one elastic sealing lip (35).

2. A closure cover (1) for closing and sealing an opening (3, 103) formed in a support plate (2, 102), comprising:
a closure cover (1) having a covering element (10) and a sealing element (15) of elastic material;
said covering element (10) includes counter-engaging elements (25) and said sealing element (15) includes engaging elements (20) wherein said engaging elements (20) are connected to said counter-engaging elements (25);
said sealing element (15) further includes a contact flange (30) and at least one elastic sealing lip (35);
said at least one elastic sealing lip (35) formed integrally with said sealing element (15) and extending circumferentially outward therefrom, to engage said support plate (2, 102) about said opening (3, 103);
said covering element (10) includes a hollow cylinder (42) having a partitioning wall (40) said hollow cylinder (42) includes on one side a peripheral flange (22), said contact flange (30) embedded in said peripheral flange (22);
said hollow cylinder (42) on the other side, includes at least one shoulder (44), said at least one shoulder encloses a portion of said sealing element (15); and,
said shoulder (44) includes a height and said at least one sealing lip include a height, said shoulder height less than said sealing lip height.

3. A closure cover according to claim 2, wherein said hollow cylinder (42) further includes a plurality of shoulders (44) distributed about a circumference of said covering element (10).

4. A closure cover according to claim 2, wherein said engaging elements (20) of said sealing element (15) are crosspieces distributed about the circumference of said closure cover (1) and embeddable in said counter-engaging elements (25) of said covering element (10).

5. A closure cover according to claim 2, wherein said sealing element (15) further includes a plurality of elastic sealing lips (35a-35d) successively extending circumferentially outward therefrom.

6. A closure cover according to claim 5, wherein said plurality of sealing lips (35a-35d) are of the same height and directed towards said contact flange (30).

7. A closure cover according to claim 5, wherein said plurality of sealing lips (35a-35d) are of different heights and facing away from said contact flange (30).

8. A cover (1) according to claim 2, wherein said sealing element (15) further includes at least another elastic sealing lip (35) formed integrally with said sealing element (15) and extending circumferentially outward therefrom to engage an upper surface of said support plate (2).

9. A closure cover (1) for closing and sealing an opening (3, 103) formed in a support plate (2, 102), comprising:
a closure cover (1) having a covering element (10) and a sealing element (15) of elastic material;
said covering element (10) includes counter-engaging elements (25) and said sealing element (15) includes engaging elements (20) wherein said engaging elements (20) are connected to said counter-engaging elements (25);
said sealing element (15) further includes a contact flange (30) and a plurality of elastic sealing lips (35a-35d);
said plurality of elastic sealing lips (35a-35d) formed integrally with said sealing element (15) and successively arranged at an outer circumference thereto for engaging said support plate (2, 102) about said opening (3, 103);
said covering element (10) includes a hollow cylinder (42) having a partitioning wall (40), said hollow cylinder (42) includes on one side a peripheral flange (22), said contact flange (30) embedded in said peripheral flange (22);
said hollow cylinder (42) on the other side, includes at least one shoulder (44), said at least one shoulder encloses a portion of said sealing element (15); and,
said shoulder (44) includes a height and said plurality of sealing lips include a height, said shoulder height less than said sealing lip height.

10. A cover (1) according to claim 9, further comprising a first elastic sealing lip (35d) extending circumferentially outward for engaging said support plate (2) about said opening (3).

11. A clover (1) according to claim 10, further comprising a second elastic sealing lip (35c) extending circumferentially outward for engaging a lower surface of said support plate (2).

12. A cover (1) according to claim 9, further comprising at least two elastic sealing lips (35a', 35d') extending circumferentially outward for engaging opposing ends of said support plate (102).

13. A cover (1) according to claim 12, further comprising at least another two elastic sealing lips (35b', 35c') extending circumferentially outward for engaging said support plate (102) about said opening (103).

* * * * *